J. H. ROSE.
ANTISKIDDING DEVICE FOR VEHICLE WHEELS.
APPLICATION FILED MAR. 21, 1917.
1,236,109.
Patented Aug. 7, 1917.
2 SHEETS—SHEET 2.
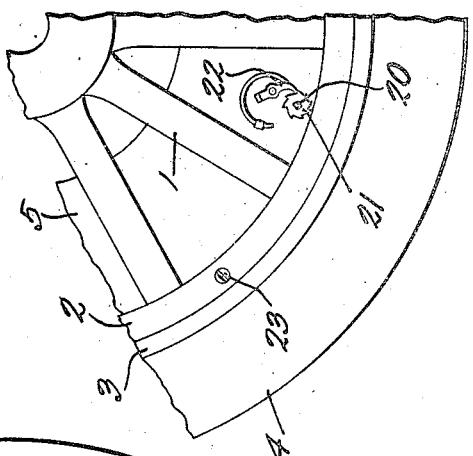
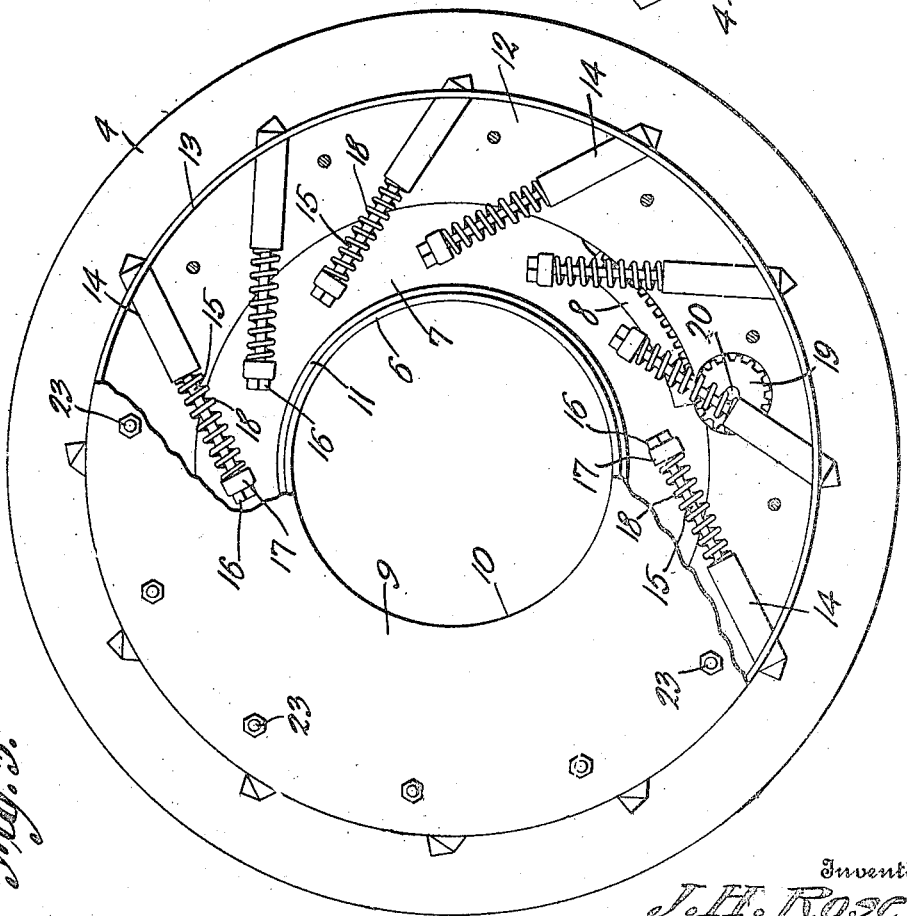

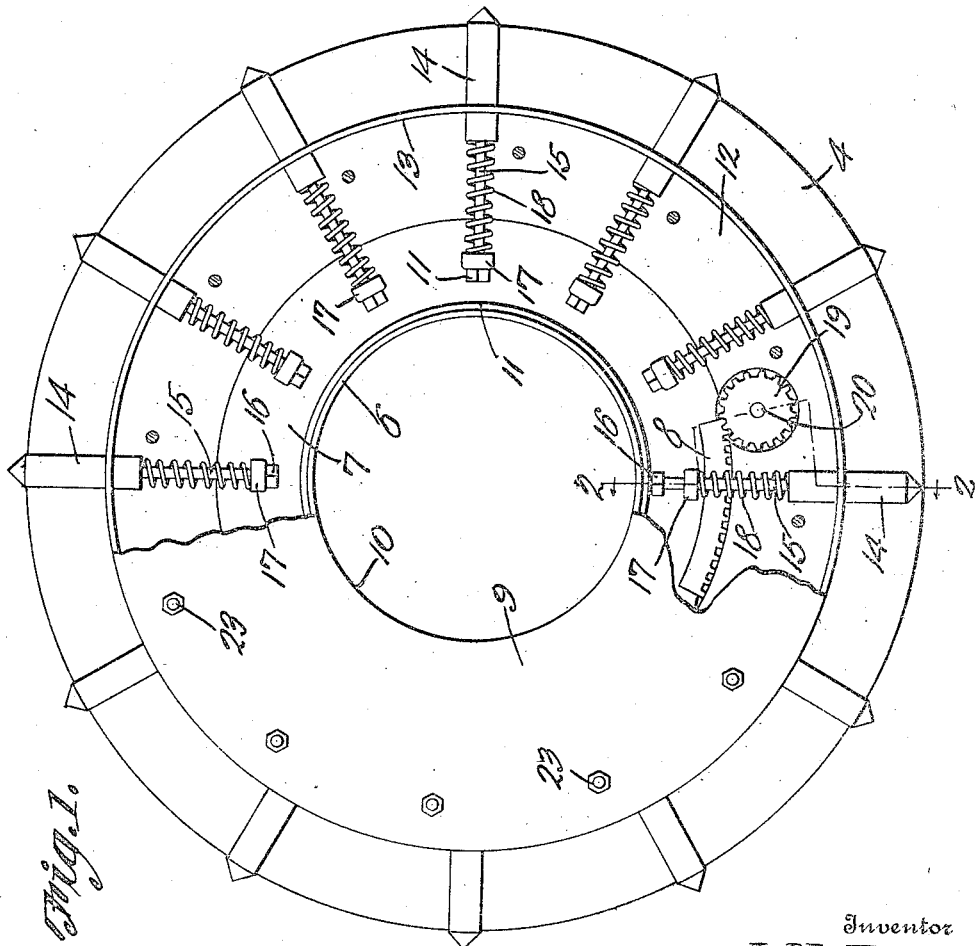

UNITED STATES PATENT OFFICE.

JOHN H. ROSE, OF LEADVILLE, COLORADO.

ANTISKIDDING DEVICE FOR VEHICLE-WHEELS.

1,236,109.   Specification of Letters Patent.   Patented Aug. 7, 1917.

Application filed March 21, 1917. Serial No. 156,349.

*To all whom it may concern:*

Be it known that I, JOHN H. ROSE, a citizen of the United States, residing at Leadville, in the county of Lake and State of Colorado, have invented a new and useful Antiskidding Device for Vehicle-Wheels, of which the following is a specification.

This invention relates to anti-skidding devices for vehicle wheels.

The primary object of the invention is to provide, in connection with the ordinary form of vehicle wheel, an attachment having spurs movable into and out of engaging position with the road bed.

Another object is to construct the spurs of the anti-skidding device so that their length may be decreased or increased with respect to the size of a vehicle tire to conform to various types of road beds.

A further object of the invention is to provide means for positively locking the spurs into or out of engaging position with the road bed.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a side view of the invention partly broken away to illustrate the operative positions of the parts with respect to a road bed.

Fig. 2 is a transverse view on the line 2—2 of Fig. 1.

Fig. 3 is a side view of the invention partly broken away to illustrate the position of the parts when out of engagement with a road bed.

Fig. 4 is a view of the spur locking means.

In the drawings, the numeral 1 designates the spokes of a vehicle wheel and 2 the felly upon which is mounted the clencher rim 3 engaging a pneumatic tire 4. An annular back plate 5 is provided with a peripheral flange 6 upon which is seated a movable ring 7 having a rack segment 8 set in a cut away portion of the periphery thereof. An annular front plate 9 is provided with a peripheral flange 10 within which is seated the flange 11 of the movable ring 7. A rigid ring 12 has a flange 13 provided with alined spaced apart openings for the reception of spurs 14. The shanks 15 of the spurs 14 are provided with heads 16 and are longitudinally movable within the swivel eyes 17 against the action of coil springs 18. The swivel eyes 17 are pivoted to the movable ring 7 to permit turning movement of the spurs 14 upon rotation of the movable ring to decrease the spur length exteriorly of the rigid ring 12.

A pinion 19 mounted upon a stub shaft 20 journaled through an opening in the back plate 5 engages the rack segment 8 to move the movable ring 7. A ratchet 21 upon the stub shaft 20 is engaged by a spring actuated pawl 22 to hold the movable ring 7 at rest.

When it is desired to move the spurs 14 into engagement with a road bed, the movable ring 7 is rotated by means of the pinion 19 and rack segment 8 until the spurs 14 are radially positioned as is illustrated in Fig. 1. Adaptation of the device to hard roads is effected by providing for longitudinal movement of the spurs 14 within the swivel eyes 17 against the coil spring 18. By rotating the movable ring 7 further, the spurs 14 are withdrawn to an inoperative position with respect to the road bed and lie tangent to the circle defined by the inner periphery of the movable ring 7.

Attention is directed to the simple manner in which the device is attached to a vehicle wheel. Bolts 23 carried by the felly 2 of the vehicle wheel extend through back plate 5, rigid ring 12 and front plate 9 to both hold the device assembled and securely upon the wheel.

What is claimed is:—

In an anti-skidding device, the combination with a vehicle wheel, of a casing comprising annular sections, one of the sections being movable, said casing provided with peripheral apertures, spurs swiveled to the movable section and slidable through the apertures, a segmental rack on the movable section, a pinion journaled in the casing and in mesh with the rack, means for revolving the pinion to turn the movable section and project the spurs, and means for securing the casing to the wheel.

In testimony that I claim the foregoing as my own, I have hereto affixed my signature in the presence of two witnesses.

JOHN H. ROSE.

Witnesses:
  JOHN M. MURRAY,
  MARTHA A. BARKLAGE.